(12) United States Patent
Feddes

(10) Patent No.: US 9,004,424 B2
(45) Date of Patent: Apr. 14, 2015

(54) BRACKET SYSTEM

(71) Applicant: Scott Feddes, Belgrade, MT (US)

(72) Inventor: Scott Feddes, Belgrade, MT (US)

( * ) Notice: Subject to any disclaimer, the term of this patent is extended or adjusted under 35 U.S.C. 154(b) by 88 days.

(21) Appl. No.: 13/760,929

(22) Filed: Feb. 6, 2013

(65) Prior Publication Data

US 2013/0200233 A1  Aug. 8, 2013

Related U.S. Application Data

(60) Provisional application No. 61/595,511, filed on Feb. 6, 2012.

(51) Int. Cl.
| | |
|---|---|
| *F16M 13/02* | (2006.01) |
| *F16B 12/34* | (2006.01) |
| *F16M 11/04* | (2006.01) |
| *F16M 13/00* | (2006.01) |
| *F16B 12/20* | (2006.01) |
| *F16B 21/09* | (2006.01) |

(52) U.S. Cl.
CPC .............. *F16M 13/02* (2013.01); *F16B 12/20* (2013.01); *F16B 21/09* (2013.01); *F16B 12/34* (2013.01); *F16M 11/041* (2013.01); *F16M 13/00* (2013.01)

(58) Field of Classification Search
CPC ...... F16L 3/1075; F16L 3/1091; F16B 45/00; F16B 21/09; F16B 12/22; F16B 12/20; F16B 12/34; F16B 37/00; F16G 1/00; F16M 11/041; F16M 13/02; H02G 7/00; H02G 7/12
USPC ............. 248/225.11, 222.51, 224.51, 224.61, 248/224.8, 681, 309.1, 917; 52/167.3, 52/167.1; 24/598.5; 403/253, 254, 353
See application file for complete search history.

(56) References Cited

U.S. PATENT DOCUMENTS

| | | | | |
|---|---|---|---|---|
| 1,455,330 | A * | 5/1923 | Fordyce ....................... 24/598.5 |
| 3,161,724 | A * | 12/1964 | Greene, Jr. et al. ........... 174/146 |
| 5,440,789 | A * | 8/1995 | Lofland ....................... 24/132 R |
| 6,123,314 | A * | 9/2000 | Steele .......................... 248/681 |
| 6,837,009 | B1 * | 1/2005 | Roth ............................ 52/167.1 |
| 7,611,109 | B2 * | 11/2009 | Lin ............................ 248/222.52 |
| 7,654,043 | B2 * | 2/2010 | Heath .......................... 52/167.3 |
| 7,946,540 | B2 * | 5/2011 | Drane et al. ..................... 248/65 |
| 8,245,992 | B2 * | 8/2012 | Matsui .......................... 248/317 |
| 2013/0306816 | A1 * | 11/2013 | Yoshida ................... 248/224.51 |

* cited by examiner

*Primary Examiner* — Tan Le
(74) *Attorney, Agent, or Firm* — Jean Kyle

(57) ABSTRACT

A pair of linearly spaced thumb screws engage a bracket that slides and locks over the thumb screws to reversibly attach an item connected to the bracket to a surface supporting the thumb screws. The bracket has a body with a length longer than the spaced thumb screws. Apertures on opposing edges of the body engage the thumb screws when the bracket is placed over the thumb screws and twisted. Tapered channels in the body of the bracket capture and hold the thumb screws as the bracket is slid along the thumb screws to secure the bracket and connected item to the surface.

12 Claims, 2 Drawing Sheets

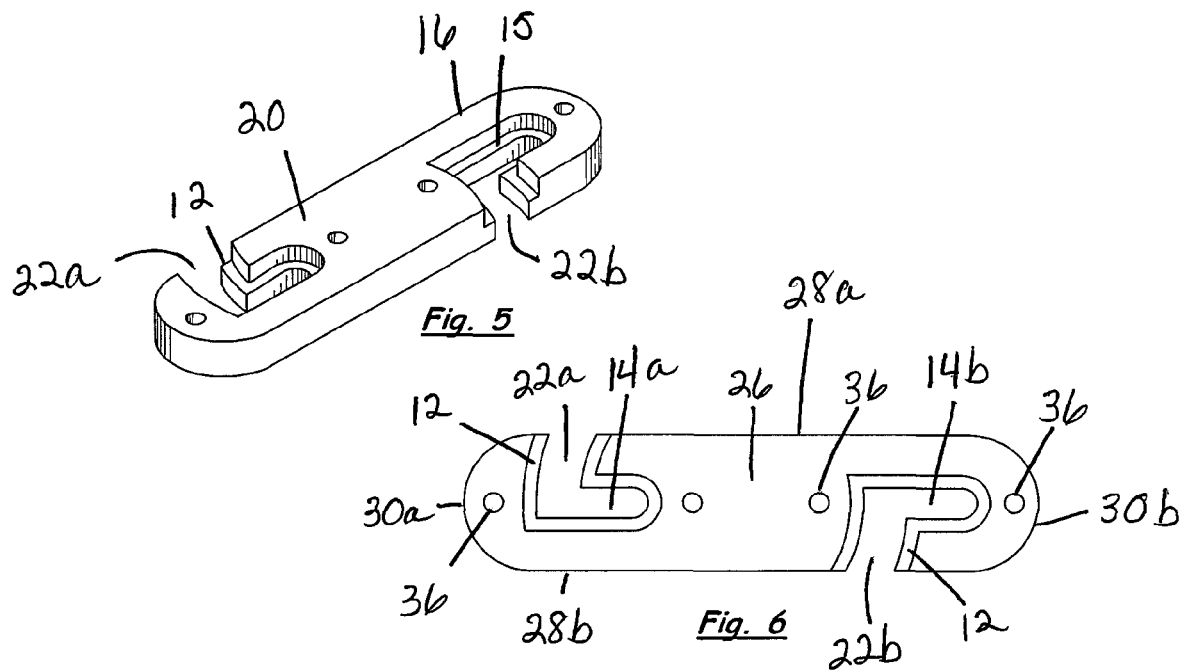
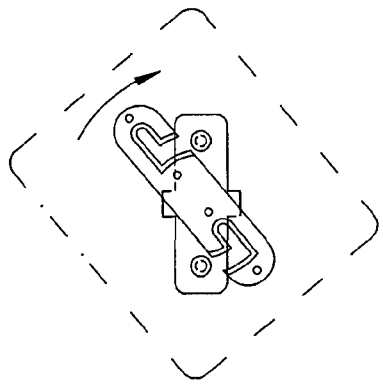
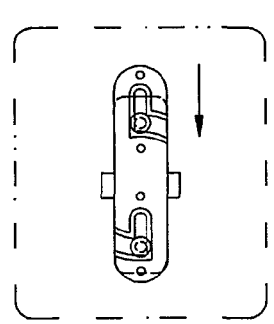
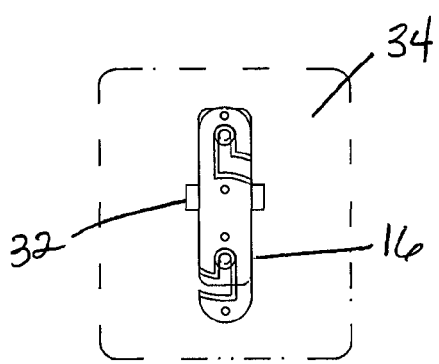

US 9,004,424 B2

BRACKET SYSTEM

CROSS-REFERENCE TO RELATED APPLICATIONS

This application claims the benefits of U.S. Provisional Application No. 61/595,511, filed Feb. 6, 2012, the disclosure of which is hereby incorporated by reference in its entirety including all figures, tables and drawings.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO SEQUENCE LISTING, A TABLE, OR A COMPUTER PROGRAM LISTING COMPACT DISC APPENDIX

Not applicable.

BACKGROUND OF THE INVENTION

Farming has always required that one understand the land and nature's many nuances. Farming however, like any industry, has evolved. Technology has entered farming and can alert a farmer to changing weather, can control farm machinery, and can plot rows for planting. Electronic displays are present in most modern farm equipment. These displays can be shared among farm implements and are often attached to a display mount. The display mount is a simple metal stand with two holes. The farmer screws bolts through the holes into the back of the display to mount the display to the stand. Mounting the display to the stand is awkward. The bolts are being applied to the display blindly from behind the stand in a tight space. Further, the dexterity required to mount the display makes it difficult for the task to be completed by a gloved hand.

A need therefore remains for a system to mount a display to a farm implement that is easy to apply even with a gloved hand. The display should be firmly held by the bracket system so the display does not shake loose from machine vibrations. The system should further allow the display to be reversibly attached to the implement so the display can be shared among machines.

All patents, patent applications, provisional patent applications and publications referred to or cited herein, are incorporated by reference in their entirety to the extent they are not inconsistent with the teachings of the specification.

BRIEF SUMMARY OF THE INVENTION

The invention involves a system by which a display can be reversibly attached to a farm implement without having to reach behind the display. Thumb screws are placed in holes in the display mount of a farm implement. An elongated bracket is attached to the back of the display. The bracket has apertures on opposite edges and near opposite ends of the bracket to capture the thumb screws so that when the bracket is placed over the thumb screws and twisted the thumb screws are captured by the bracket. To secure the display to the mount, the display and bracket are pulled downward. The thumb screws travel along tapered channels in the bracket to lock the thumb screws in place. To remove the display, the user pushes the display upward and twists to release the thumb screws from the bracket.

BRIEF DESCRIPTION OF THE SEVERAL VIEWS OF THE DRAWING

FIG. 5 is a top perspective view of a preferred embodiment of the bracket of the subject invention.

FIG. 6 is a top plan view of the bracket shown in FIG. 5.

FIG. 7 is a top plan view showing the twisting motion by which the bracket of the subject invention engages the pins, with the display mounted to the bracket shown in phantom.

FIG. 8 is a top plan view showing the sliding motion by which the bracket and display are secured to the pins, the display shown in phantom.

FIG. 9 is a top plan view showing the display connected to the display mount via a preferred embodiment of the bracket of the subject invention.

DETAILED DESCRIPTION OF THE INVENTION

The bracket system of the subject invention allows for the reversible attachment of an item to a surface. A bracket is connected to the item and pins to engage the bracket are connected to the surface.

Figure 2:
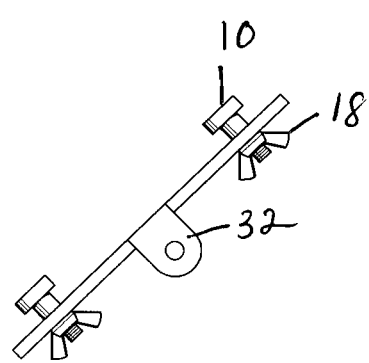
FIG. 2 is a side elevational view preferred pins attached to a display mount for use with the bracket of the subject invention.
Figure 4:
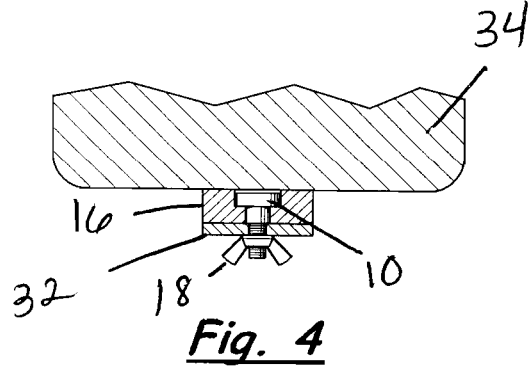
FIG. 4 is a partial cross-sectional view along line 4 of FIG. 3 showing a preferred embodiment of the channel capturing the pin and holding the display to the display mount.

The pins 10 of the bracket system of the subject invention must be capable of being captured and held by the bracket that is connected to the display. In the exemplified embodiment, the pins are thumb screws that have a flattened head. The flattened head prevents the pin from escaping the shoulder 12 of the channel 14 on the bracket 16 (FIGS. 4 and 9). In a preferred embodiment, the thumb screws are secured by wing nuts 18 (FIG. 2). Wing nuts are easier to manipulate than a simple nut. While it is important that the pins of the subject invention are easy to install, applicant notes that the pins of the bracket system of the subject invention do not need to be the exemplified thumb screws and wing nuts but can be anything that can be effectively captured and held by the bracket member.

The bracket of the bracket system of the subject invention has a body 20 with apertures 22 to capture the pins of the system and channels 14 to hold the pins within the bracket. In the exemplified embodiment, the pins are spaced linearly. A preferred embodiment of the bracket shown in FIG. 5. In the exemplified embodiment, the body elongated and planar. It is noted however that the body can be any shape and size it is just necessary that the body have sufficient area to capture both pins. The body can be formed of any material that securely captures and hold the pins. Material that are lightweight, durable in varied temperatures, and resistant to corrosion are advantageous in a farm environment. Suitable materials include, but are not limited to, plastics, composites, and light metals, such as aluminum. Apertures 22 appear on opposing edges of the body. The apertures are spaced the same distance as the pins. In the exemplified embodiment, apertures 22 appear on a first elongated edge 28a of the elongated body and on a second opposing elongated edge 28b of the body. A first aperture 22a is positioned near a first end 30a of the elongated body. A second aperture 22b is positioned nearer the center 26 distal the opposing end 30b (FIG. 6). The apertures are spaced the distance of the pins and on opposing edges of the body. Channels or slots 14a, 14b, respectively, extend from the apertures along the body. The pins are moved into the channels and the channels hold the pins to the bracket. In the exemplified embodiment, the channels 14 have shoulders 12 to capture the flattened heads of the thumb screws. The channels however need only be configured to effectively capture and hold the pins of the bracket system of the subject invention. The pins slide within the channels as the item attached to the bracket is moved by the user. This seats the pins within the bracket to hold the item to the surface. In a particularly preferred embodiment, the floor of the channels 15 are tapered toward the end of the channel distal the aperture (FIG. 5). Therefore, as the pins slide along the channel they are held more tightly within the channel as the pins near the channel's end.

The bracket system of the subject invention allows a display to be easily and readily secured to a farm implement. To use the bracket system, pins are applied in a linear spaced relation on a mounting surface. The bracket is applied to the item to be mounted to the surface. The bracket is then placed over the pins. The item connected to the bracket is rotated so the apertures in the bracket capture both pins (FIG. 7). The item is then moved by the user to slide the pins into the channels away from the apertures (FIG. 8) to hold the item to the surface (FIG. 9). To remove the item from the surface, the user moves the item in the opposite direction to move the pins along the channels toward the apertures. Once the pins near the apertures, the item is rotated in the opposite direction to release the pins from the bracket. The system allows an item to be quickly installed, removed, and/or moved from one surface to another.

Figure 1:
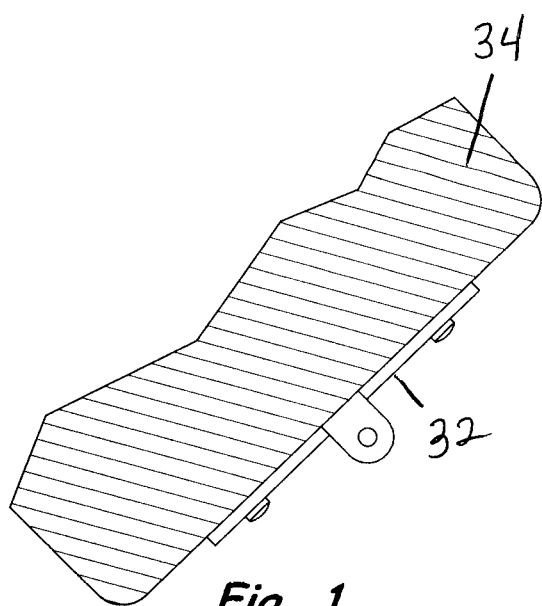
FIG. 1 is a partial side elevational view showing a display mounted to a display mount of a farm implement per the prior art.
Figure 3:
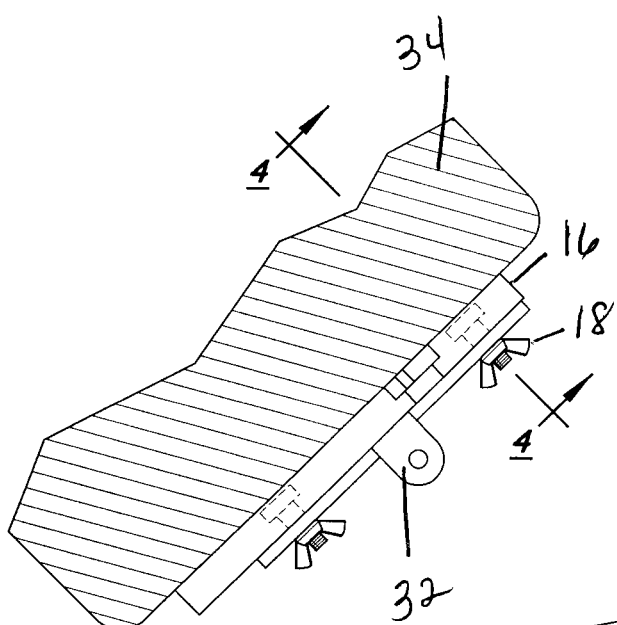
FIG. 3 is a partial side elevational view showing a display mounted to a display mount of a farm implement by a preferred embodiment of the bracket of the subject invention.

The bracket system of the subject invention is used to reversibly attached a display to a farm implement (FIG. 3). The pins of the bracket system are applied to the display mount 32 (FIG. 2) of the implement. The bracket is connected to the display 34 with screws through holes 36 in the body 20 of the bracket 16. Current systems for mounting displays in farm implements require the user to attach the display to a stand with bolts blindly behind the display and in tight quarters (FIG. 1). To remove the display, the user must again manipulate the bolts blindly to remove them. The user is then left with the display and the loose bolts. In contrast, the system of the subject invention allows a user to quickly attach and remove a display. The pins are attached to the stand on the implement in view because they do not attach to the display (FIG. 2). Once those pins are in place no further tools are required. Pins can be installed and left in each implement the user intends to drive so the user need only carry the display from one place to another. While this is preferred and most versatile, applicant notes the bracket of the subject invention can be connected to the display mount of the implement and the pins can be connected to the display.

The two step connection of the display to the implement, twist then move, provides a secure connection that won't be displaced by vibrations of the machine. Further, the orientation of the display of anything but straight provides a visual indication the display is not locked into the bracket. The bracket system of the subject invention provides a quick, and easy way to secure a display within a farm implement. Applicant notes that although the subject bracket system is shown for this specific use, the bracket system of the subject invention can be used in any application where it is desirable to reversibly secure an item to a surface.

It is understood that the foregoing examples are merely illustrative of the present invention. Certain modifications of the articles and/or methods may be made and still achieve the objectives of the invention. Such modifications are contemplated as within the scope of the claimed invention.

The invention claimed is:

1. A bracket capable of engaging pins spaced linearly at a distance on a planar surface, the bracket comprising:
    a body comprising a top side and a bottom side, an edge, an opposite edge, an end, and an opposite end;
    a first aperture on the edge near the end, the first aperture comprising a first opening extending into the body perpendicularly from the edge and a first channel extending from the first opening toward the opposite end, the first channel comprising a shoulder to capture a head of the pins, a floor of the first channel tapering distal the first opening;
    a second aperture on the opposite edge nearer a center of the body, the second aperture comprising a second opening extending into the body perpendicularly from the opposite edge and a second channel extending from the second opening toward the opposite end, the second channel comprising a shoulder to capture the head of the pins, a floor of the second channel tapering distal the second opening;
    wherein the first aperture and the second aperture are spaced at the distance of the pins and the bracket captures the pins when the body is twisted over the pins and the pins are slid along the channels.

2. The bracket of claim 1, wherein said first aperture and said first channel and said second aperture and said second channel are disposed along both sides and through said body.

3. The bracket of claim 1, wherein said body is elongated.

4. The bracket of claim 1, wherein said body is planar.

5. The bracket of claim 1, wherein said body is elongated and planar.

6. A bracket capable of engaging pins spaced at a distance on a surface, the bracket comprising:
    an elongated body comprising a top side and a bottom side, an elongated edge, an opposite elongated edge, an end, and an opposite end;
    a first aperture on the elongated edge near the end, the first aperture comprising a first opening extending into the elongated body perpendicularly from the edge and a first channel extending from the first opening toward the opposite end, the first channel comprising a shoulder to capture a head of the pins, a floor of the first channel tapering distal the first opening;
    a second aperture on the opposite elongated edge nearer a center of the elongated body, the second aperture comprising a second opening extending into the elongated body perpendicularly from the opposite edge and a second channel extending from the second opening toward the opposite end, the second channel comprising a shoulder to capture the head of the pins, a floor of the second channel tapering distal the second opening;
    wherein the first aperture and the second aperture are spaced at the distance of the pins and the bracket captures the pins when the body is twisted over the pins and the pins slide along the channels.

7. The bracket of claim 6, wherein said first aperture and said first channel and said second aperture and said second channel are disposed along both sides and through said elongated body.

8. In combination a bracket system comprising: a bracket and pins, the bracket capable of engaging the pins when the pins are spaced linearly at a distance on a planar surface, the bracket comprising;
   a body comprising a top side and a bottom side, an edge, an opposite edge, an end, and an opposite end;
   a first aperture on the edge near the end, the first aperture comprising a first opening extending into the body perpendicularly from the edge and a first channel extending from the first opening toward the opposite end, the first channel comprising a shoulder to capture a head of the pins, a floor of the first channel tapering distal the first opening;
   a second aperture on the opposite edge nearer a center of the body, the second aperture comprising a second opening extending into the body perpendicularly from the opposite edge and a second channel extending from the second opening toward the opposite end, the second channel comprising a shoulder to capture the head of the pins, a floor of the second channel tapering distal the second opening; wherein the first aperture and the second aperture are spaced at the distance of the pins and the bracket captures the pins when the body is twisted over the pins and the pins slide along the channels to secure the bracket to the surface.

9. The bracket of claim 8, wherein said first aperture and said first channel and said second aperture and said second channel are disposed along both sides and through said body.

10. The bracket of claim 8, wherein said body is elongated and planar.

11. The bracket of claim 8, wherein said bracket is connected to an item.

12. The bracket of claim 8, wherein said pins are connected to an item.

\* \* \* \* \*